United States Patent [19]

Tanaka et al.

[11] Patent Number: 4,578,685
[45] Date of Patent: Mar. 25, 1986

[54] PEN CHANGEOVER MECHANISM FOR PEN RECORDER

[75] Inventors: Hideto Tanaka, Tamayama; Kyuichi Fujisawa, Tonan, both of Japan

[73] Assignee: Alps Electric Co., Ltd., Japan

[21] Appl. No.: 604,723

[22] Filed: Apr. 27, 1984

[30] Foreign Application Priority Data

Apr. 27, 1983 [JP] Japan ................... 58-74756

[51] Int. Cl.$^4$ ...................... G01D 15/16; G01D 9/28
[52] U.S. Cl. .................................. 346/139 R; 346/49
[58] Field of Search ............. 346/139 R, 140 R, 49, 346/50, 136, , 141

[56] References Cited

U.S. PATENT DOCUMENTS 4,157,552  6/1979  Nakajima ................. 346/139 R
4,405,931  9/1983  Fujisawa ................... 346/139 R

*Primary Examiner*—E. A. Goldberg
*Assistant Examiner*—Mark Reinhart
*Attorney, Agent, or Firm*—Guy W. Shoup

[57] ABSTRACT

A pen recorder is provided with a holder base and a hammer base which are movable along a platen. A plurality of pens are mounted in parallel on the holder base. A hammer for pressing any one of the pens is mounted on the hammer base. One of the bases is driven by a driving means such as a pulse motor. Moreover, a lock mechanism is provided for connecting the holder base and the hammer base. Thus, it becomes possible to select the pen to be pressed by the hammer through the movement of relative position between the bases effected by the lock mechanism.

11 Claims, 13 Drawing Figures

PEN CHANGEOVER MECHANISM FOR PEN RECORDER

BACKGROUND OF THE INVENTION

1. Field of the Invention

The present invention relates to a pen recorder that effects printing by relatively moving a recording sheet and a pen in the X-Y directions while selectively using a plurality of pens for different colors.

2. Description of the Prior Art

Recent various data processing apparatus employ a pen recorder as an output device for drawing characters and figures in multiple color. This pen recorder selectively uses pens for different colors for drawing characters and figures by relatively moving a recording sheet and a selected pen in the X-Y directions.

Hitherto, such a mechanism for selecting one of a plurality of pens is known as having a solenoid mechanism mounted on a movable base which is adapted to press the pens individually. This mechanism, however, causes an increase in size as well as weight of the movable base to make the recorder as a whole larger in size, disadvantageously. Moreover, such a mechanism has recently been spread as having a rotary pen holder mounted on a movable base to select one of a plurality of pens through the rotation of the pen holder. In this mechanism, however, a driving mechanism for changing over the pens is complicated, and it is difficult to make the recorder as a whole thinner owing to the vertical dimension of the pen holder. In addition, the rotary pen holder is rotated a predetermined angle in order to select a pen of a given color; therefore, when the rotation angle is large the solenoid and the like must be repeatedly operated, so that the time required for changing over the pens is unfavorably long.

SUMMARY OF THE INVENTION

Accordingly, a primary object of the invention is to provide a pen recorder improved to permit the pen holding portion to be thinner as well as allow the pens to be speedily changed over from one to another, thereby to overcome the above-mentioned disadvantages of the prior art.

To this end, according to the invention, there is provided a pen recorder comprising: holder and hammer bases adapted to be movable along a platen, one of the bases being driven by a driving means such as a pulse motor; a plurality of pens mounted in parallel on the holder base; a hammer for pressing any one of the pens; and a lock mechanism for connecting the holder and hammer bases, whereby the pen to be pressed by the hammer can be selected through the movement of relative position between the bases effected by the lock mechanism.

The above and other objects, features and advantages of the invention will become clear from the following description of the preferred embodiment taken in conjunction with the accompanying drawings.

BRIEF DESCRIPTION OF THE DRAWINGS

The accompanying drawings in combination show an embodiment of the invention, in which.

DESCRIPTION OF THE PREFERRED EMBODIMENT

An embodiment of the invention will be described hereinunder with reference to the accompanying drawings.

(Construction of the Pen Recorder)

Figure 1:
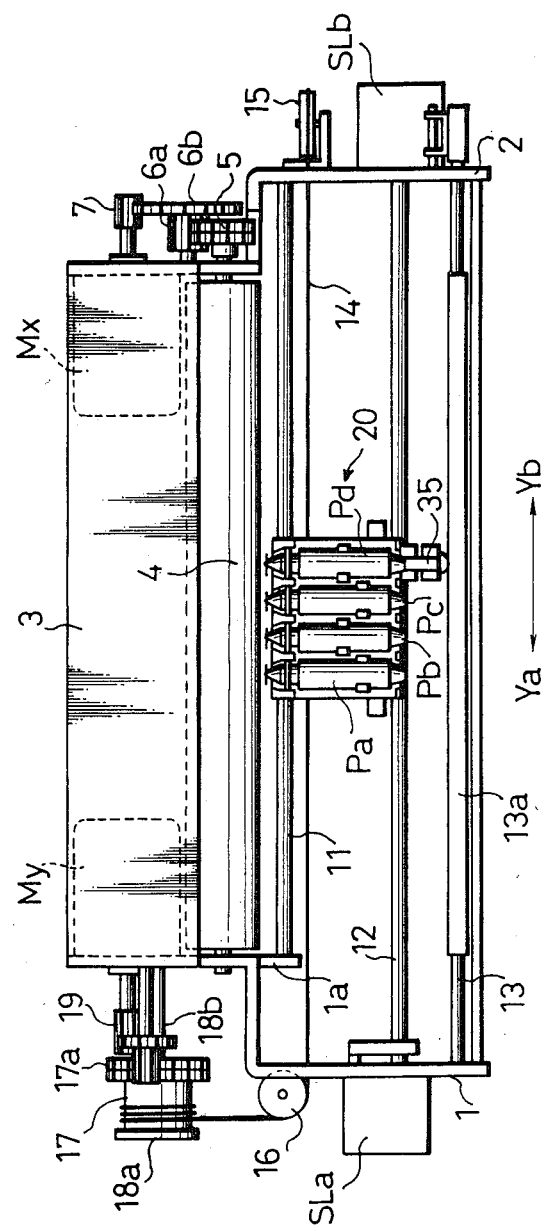
FIG. 1 is a plan view of a pen recorder in accordance with the invention.
Figure 2:
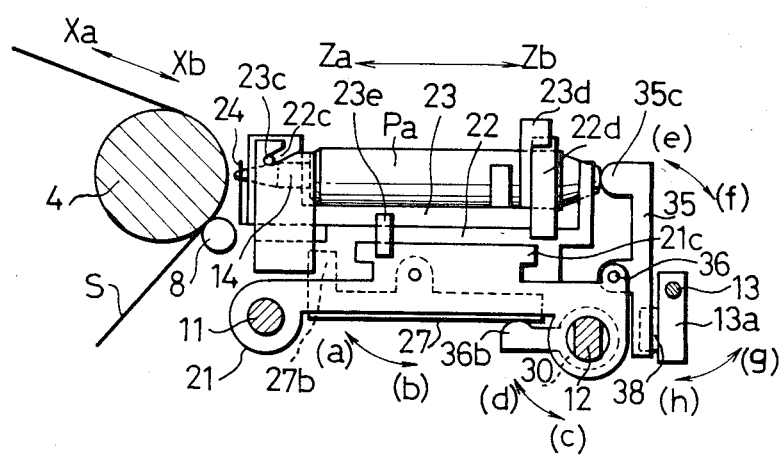
FIG. 2 is a side elevational view of a pen holding portion of the pen recorder shown in FIG. 1.

FIG. 1 is a plan view of an embodiment of the pen recorder in accordance with the invention, and FIG. 2 is a side elevational view of the embodiment, particularly showing a recording operation portion thereof.

In the drawings, a reference numeral 1 denotes a left side plate of the base, while a numeral 2 represents a right side plate thereof. A rear cover 3 is installed between the side plates 1 and 2. In addition, a platen 4 is provided between the side plates 1 and 2. The platen 4 is cylindrical in shape and has a shaft rotatably supported by the side plates 1 and 2. The shaft of the platen 4 projects outwardly from the right side plate 2 as well as has a gear 5 secured to the end thereof. An intermediate gear constituted by a pinion 6a and a gear wheel 6b is provided outside the right side plate 2. The gear 5 is in engagement with the pinion 6a. Moreover, a pulse motor Mx is installed underneath the rear cover 3 and on the inside of the right side plate 2. A pinion 7 is secured to the rotary shaft of the pulse motor Mx. The pinion 7 is in engagement with the gear wheel 6b. The power derived from the pulse motor Mx is transmitted to the gear 5 through the intermediate gears 6a, 6b to rotate the platen 4. As shown in FIG. 2, a pinch roller 8 is in pressure contact with the front lower portion of the platen 4. A recording sheet S is clamped between the platen 4 and the pinch roller 8. The arrangement is such that when the platen 4 is rotated by the power derived from the pulse motor Mx the recording sheet S is moved while reciprocating in the directions of arrows Xa and Xb.

As shown in FIG. 1, the left side plate 1 is bent in a crank-like shape and has a support member 1a projecting from the bent portion thereof. A guide shaft 11 is stretched between the support member 1a and the right side plate 2. Moreover, between the side plates 1 and 2, a pen changeover shaft 12 and a hammer driving shaft 13 are stretched in parallel to the guide shaft 11. A carriage 20 is slidably provided on both the guide shaft 11 and the pen changeover shaft 12. On the carriage 20, four pens Pa, Pb, Pc and Pd are installed in parallel to each other. These four pens Pa to Pd are of four colors, e.g., red, blud, black and green, respectively. The carriage 20 is pulled by means of a wire 14. More specifically, the wire 14 connected to the right end (as viewed in the Figure) of the carriage 20 is passed over a pulley 15 provided outside the right side plate 2. The wire 14 extending from the pulley 15 passes through the right side plate 2 and extends through the lower side of the carriage 20. A pair of upper and lower pulleys are provided outside the left side plate 1. The wire 14 passing through the lower side of the carriage 20 is passed over the lower pulley and further wound on a driving bobbin 17. The wire 14 after being wound on the driving bobbin 17 is passed over the upper pulley 16 and is then connected to the left side of the carriage 20. The driving bobbin 17 is rotatably supported by the left side plate 1. The driving bobbin 17 has at its proximal end a gear 17a integrally formed therewith. In addition, an intermediate gear constituted by a pinion 18a and a gear wheel 18b is rotatably provided outside the left side plate 1. The gear 17a is in engagement with the pinion 18a of the intermediate gear. Moreover, a pulse motor My is installed underneath the rear cover 3 and on the inside of the left side plate 1. A pinion 19 is secured to the rotary shaft of the pulse motor My. The pinion 19 is in engagement with the gear wheel 18b of the intermediate gear. The rotation of the pulse motor My is transmitted to the driving bobbin 17 through the intermediate gear. The arrangement is such that a driving force is transmitted to the wire 14 through the rotation of the driving bobbin 17 to move the carriage 20 while reciprocating in the directions of arrows Ya and Yb.

A pen changeover solenoid SLa is provided outside the left side plate 1. This solenoid SLa is a bilateral stable type self-maintaining solenoid. The pen changeover shaft 12 is rotated by means of the solenoid SLa so that from the pens Pa to Pd one of a given color is selected by a pen changeover mechanism, described later.

Moreover, a hammer driving solenoid SLb is provided outside the right side plate 2. This solenoid SLb is also a bilateral stable type self-maintaining solenoid. The hammer driving shaft 13 is rotated by means of the solenoid SLb so that a given pen is pushed toward the platen 4 (in the direction of an arrow Za) by means of a hammer driving mechanism, described later.

(Construction of Pen Holding Mechanism)

Figure 3:
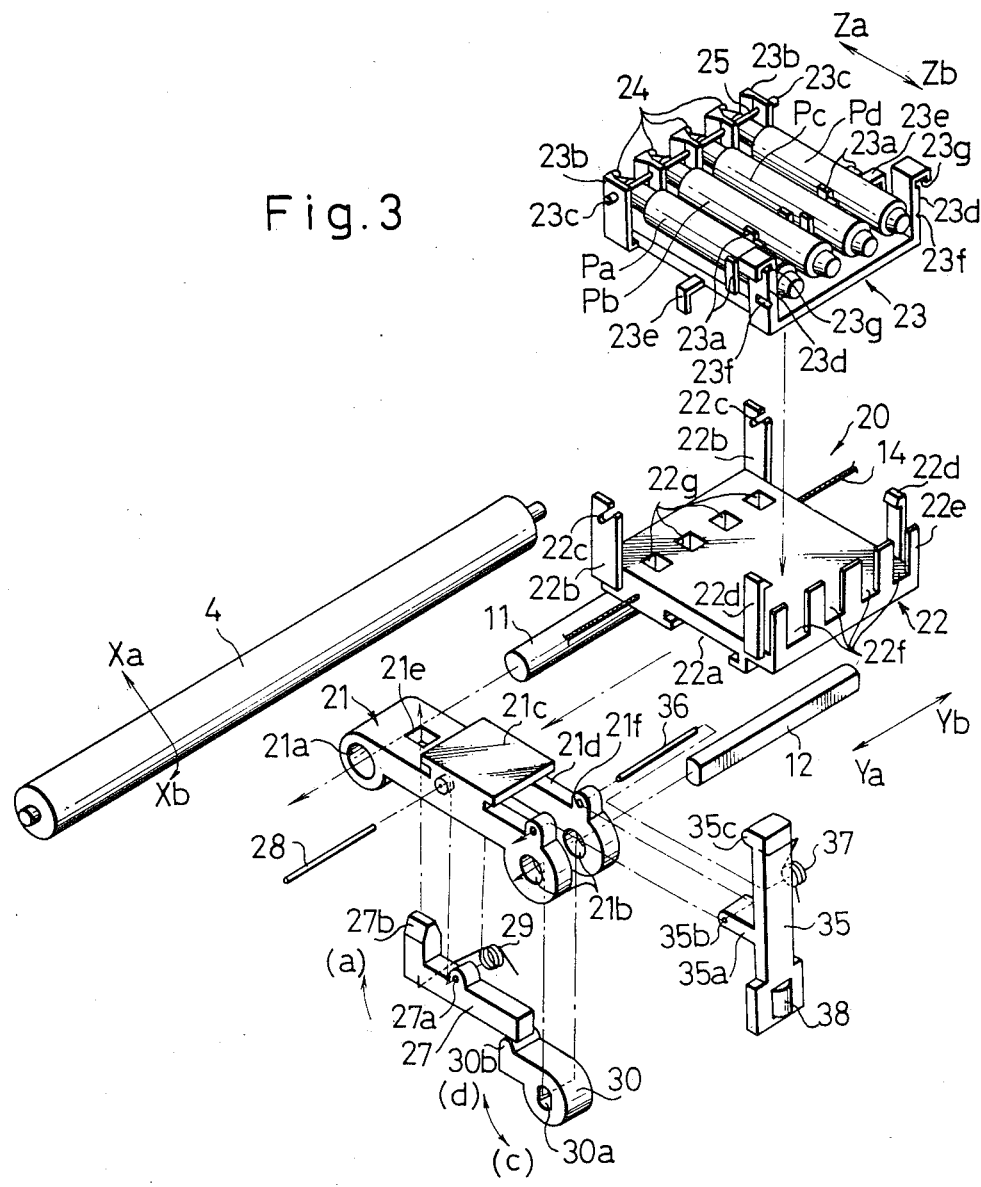
FIG. 3 is an exploded perspective view of the pen holding portion shown in FIG. 2.

The construction of the pen holding mechanism is mainly shown in FIGS. 2 and 3 (an exploded perspective view).

The pen carriage 20 is basically assembled from three members: a hammer base 21, a holder base 22 disposed thereon, and a pen holder 23 disposed on the holder base 22. These members are molded from a resin.

On the hammer base 21 is mounted the driving portion of the pen changeover mechanism and the hammer driving mechanism, described later. The hammer base 21 has a support bore 21a formed in the front part thereof and a pair of support bores 21b formed in the rear part thereof. One support bore 21a is adapted to slidably receive the guide shaft 11, while the other support bores 21b are adapted to slidably receive the pen changeover shaft 12. In addition, the hammer base 21 has a T-shaped projection 21c formed on the upper surface thereof. On the other hand, the holder base 22 has a T-shaped slide groove 22a formed in the undersurface thereof. The slide groove 22a and the projection 21c engage with each other (see FIG. 2) so that the holder base 22 can move on the hammer base 21 relatively thereto in the directions of the arrows Ya and Yb. It is to be noted that the wire 14 is connected to both end portions of the holder base 22.

The holder base 22 is provided with a pair of support members 22b integrally formed therewith at both ends of the front part thereof, respectively. In the upper part of each support member 22b, a support groove 22c is formed which is inclined at a predetermined angle with respect to the bottom surface of the holder base 22. In addition, a pair of hooks 22d are integrally formed at both ends of the rear part of the holder base 22, respectively. Each hook 22d has an inward protrusion formed at its upper end. Moreover, a rear side plate 22e is provided at the rear end of the holder base 22. The rear side plate 22e is provided with four notches 22f.

On the pen holder 23, the above-mentioned four pens Pa, Pb, Pc and Pd are mounted in parallel to each other. The pen holder 23 is provided on its upper surface with four sets (eight in total) of support pieces 23a. The pens Pa to Pd are retained by the respective support pieces 23a so as to be slidable in the directions of arrows Za and Zb (the directions in which the pens come close to and away from the platen 4, respectively). The pen holder 23 further has leaf springs 24 provided at its front end portion. The point of each of the pens Pa to Pd is in engagement with the corresponding one of the leaf springs 24 so that the pens Pa to Pd are urged in the direction of the arrow Zb (in the direction in which the pens come away from the platen 4) by the resilient forces of the leaf springs 24, respectively. In addition, five partition plates 23b are integrally formed on the front upper surface of the pen holder 23. The point portions of the respective pens Pa to Pd are partitioned from each other by the partition plates 23b. Moreover, a shaft 25 is provided passing through the partition plates 23b so as to maintain the spacing between the adjacent partition plates 23b as well as prevent the pen points from coming off upwardly. Further, pins 23c are integrally formed outside the rightmost and leftmost ones of the five partition plates 23b, respectively. Furthermore, a pair of retainer members 23d are provided on both sides of the rear part of the pen holder 23. The retainer members 23d are formed to have such a thickness that they can be slightly elastically deformed inwardly, i.e., toward to each other. The retainer grooves 23d have grooves 23f, 23g formed in their outer surfaces for engagement with the hooks 22d, respectively. In addition, a pair of L-shaped stoppers 23e are provided on the right and left sides of the pen holder 23.

When the pen holder 23 is installed on the holder base 22, the pins 23c formed on the side portions of the partition plates 23b in the front part of the pen holder 23 are inserted, from the obliquely upper side, into the support grooves 22c formed in the support members 22b on the holder base 22, respectively, and the grooves 23g in the retainer members 23d are snap-in fitted with the hooks 22d on the holder base 22 from the inner side, respectively. Thus, the pen holder 23 is fixed on the holder base 22. In this fixed state, the rear ends of the pens Pa to Pd are located within the respective notches 22f formed in the rear side plate 22e of the holder base 22. In addition, the stoppers 23e formed on both sides of the pen holder 23 downwardly project beyond the holder base 22. When the holder base 22 relatively moves on the hammer base 21, the stoppers 23e abut against the hammer base 21 so that holder base 22 will not come off from the hammer base 21.

(Construction of Pen Changeover Mechanism)

The construction of the pen changeover mechanism is mainly shown in FIGS. 3 to 7.

The hammer base 21 has a notch 21d formed in its rear part. A lock lever 27 is provided within the notch 21d. The lock lever 27 has a support bore 27a formed in its central upper part. A pin 28 penetrating the hammer base 21 is received by the support bore 27a for pivotally supporting the lock lever 27. Moreover, the lock lever 27 has an upward lock member 27b integrally formed at the front part thereof. Both sides of the upper end portion of the lock member 27b are tapered. In addition, the pin 28 projects from the right side surface of the hammer base 21. The projecting portion of the pin 28 is wound with a spring 29. One of arms of the spring 29 is retained by the hammer base 21, while the other arm is retained by the front lower part of the lock lever 27. By the resilient force of the spring 29, the lock lever 27 is urged in such a direction that the lock member 27b moves upwardly, i.e., in the direction of an arrow (a).

A square bore 21e is formed in the front part of the hammer base 21. Also in the bottom part of the holder base 22, four square bores 22g are formed. These square bores 21e and 22g are substantially equal in dimension to each other, having such a size as to be able to fit with the lock member 27b of the lock lever 27. The four square bores in the holder base 22 are formed directly below the four pens Pa to Pd, respectively. When the lock lever 27 is urged in the direction of the arrow (a) by the spring 29, the lock member 27b formed at the front end of the lock lever 27 upwardly projects from the square bore 21e in the hammer base 21 and fits with one of the square bores 22g in the holder base 22 thereby to lock the hammer base 21 and the holder base 22 into each other. Moreover, an urging lever 30 is provided in the rear part of the notch 21d in the hammer base 21. The urging lever 30 has an oval bore 30a. The pen changeover shaft 12 received by the support bores 21b in the hammer base 21 is also oval in cross-section and fits in the bore 30a in the urging lever 30, so that the pen changeover shaft 12 and the urging lever 30 rotate as one unit. Although the lock lever 27 is urged in the direction of the arrow (a) by the spring 29, the rear end portion of the lock lever 27 is in pressure contact with a pressing portion 30b of the urging lever 30.

On the other hand, the bilateral stable type self-maintaining solenoid SLa is provided outside the left side plate 1 as described hereinbefore. When the actuator of the solenoid SLa is actuated, the pen changeover shaft 12 is rotated in a flip-flop manner in the directions of arrows (c) and (d) (see FIGS. 2 and 5). When both the pen changeover shaft 12 and the urging lever 30 are rotated in the direction of the arrow (c), the lock lever 27 is pivoted in the direction of the arrow (a) by the force of the spring 29, so that the hammer base 21 and the holder base 22 are locked into each other by the lock member 27b. To the contrary, when both the pen changeover shaft 12 and the urging lever 30 are rotated in the direction of the arrow (d), the pressing portion 30b presses the rear part of the lock lever 27 to cause the lock member 27b to slip out of one of the square bores 22g in the holder base 22, thereby allowing the holder base 22 to be free on the hammer base 21.

(Construction of Hammer Mechanism)

The construction of the hammer mechanism is mainly shown in FIGS. 2 and 3.

A hammer 35 is provided within the notch 21d in the rear part of the hammer base 21. The hammer 35 has a support protrusion 35a provided in the center thereof. The support protrusion 35a has a support bore 35b formed at its front end. Moreover, bores 21f are formed in upper end portions in the rear part of the hammer base 21. The bores 21f receive a pin 36, which is received by the support bore 35b in the hammer 35 to pivotally support the same. In addition, the right end of the pin 36 projects from the right side of the hammer base 21. The projecting portion of the pin 36 is wound with a spring 37. One of arms of the spring 37 is retained by the hammer base 21, while the other arm is retained by the upper rear surface of the hammer 35. The hammer 35 is urged in the direction of an arrow (e) (see FIG. 2) by the resilient force of the spring 37. As shown in FIG. 2, a pressing portion 35c formed at the upper end of the hammer 35 faces the rear end of one of the pens Pa to Pd on the pen holder 23. Moreover, a roller 38 is rotatably provided in the lower part of the hammer 35.

On the other hand, the hammer driving shaft 13 is provided in its center a pressure plate 13a having a rectangular cross-section (see FIG. 2). The pressure plate 13a is in contact with the roller 38 provided in the lower part of the hammer 35. As mentioned hereinbefore, the bilateral stable type self-maintaining solenoid SLb is provided on the right side of the right side plate 2. When the solenoid SLb is energized, the hammer driving shaft 13 is rotated in a flip-flop manner in the directions of arrows (g) and (h) (see FIG. 2). When both the hammer driving shaft 13 and the pressure plate 13a are rotated in the direction of the arrow (g), the hammer 35 is pivoted in the direction of the arrow (e) by the force of the spring 37 to cause the pressing portion 35c formed in the upper part of the hammer 35 to press one of the pens Pa to Pd toward the platen 4. To the contrary, when both the hammer driving shaft 13 and the pressure plate 13a are rotated in the direction of the arrow (h), the pressure plate 13a pushes the roller 38 to cause the hammer 35 to pivot in the direction of an arrow (f), so that the pressing portion 35c separates from the rear end of the pen.

The following is the description of the operation of the pen recorder having the above construction.

(Pen Loading/unloading Operation)

Figure 8:
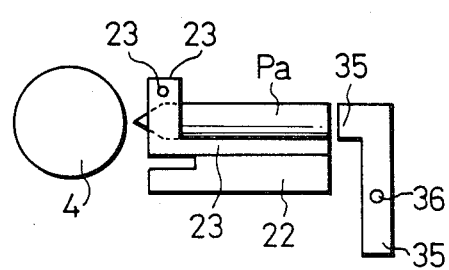
FIGS. 8 and 9 are side elevational views in combination showing the pen loading/unloading operation.
Figure 9:
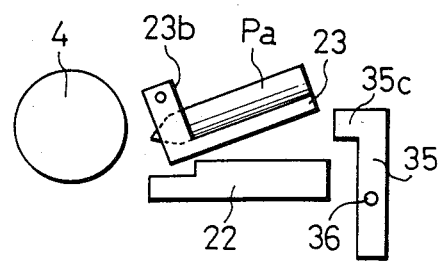
Figure 10:
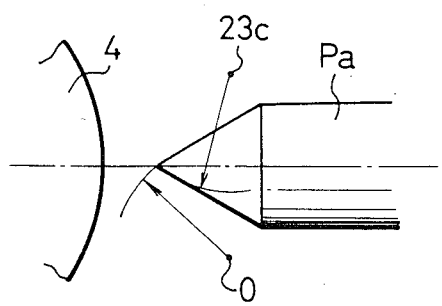
FIG. 10 is an enlarged view showing the relationship between the pen point and a platen of the pen recorder shown in FIG. 1 when the pens are removed.

The pen loading/unloading operation is shown in FIGS. 8 to 10 together with FIGS. 2 and 3.

To load the four pens Pa to Pd onto the pen holder 23, the following two methods are available.

According to a first method, the pen holder 23 is removed from the holder base 22 for loading the pens. The procedure of the method is as follows: First of all, the retainer members 23d of the pen holder 23 are deformed by contracting them toward each other to undo the engagement between the retainer members 23d and the corresponding hooks 22d. The retainer members 23d are moved upwardly to obliquely lift up the rear part of the pen holder 23 (the state shown in FIG. 9). Then, with the retainer members 23d held, the pen holder 23 is drawn out obliquely rearward to slip the pins 23c provided on the sides of the pen holder 23 out of the corresponding support grooves 22c formed in the support members 22b of the holder base 22, respectively. After the pen holder 23 is thus removed from the holder base 22, the four pens Pa to Pd are loaded onto the pen holder 23. At this time, the points of the respective pens are engaged with the corresponding leaf springs 24, and the pen bodies are retained by the support pieces 23a, respectively. After the completion of the loading of the four pens Pa to Pd, the pen holder 23 is installed on the holder base 22 again. This operation is reverse to that for removing the pen holder 23 from the holder base 22. More specifically, first of all, the pins 23c of the pen holder 23 are obliquely inserted into the corresponding support grooves 22c in the holder base 22. Then, the rear part of the pen holder 23 is moved downwardly, and the retainer members 23d are engaged with the corresponding hooks 22d of the holder base 22. At this time, the retainer members 23d snap-in fit with the corresponding hooks 22d by means of their own resilient forces, respectively.

According to a second method, the pens are loaded, with the pen holder 23 maintained on the holder base 22. The procedure of this method is as follows: First of all, the retainer members 23d formed in the rear part of the pen holder 23 are contracted toward each other to undo the engagement between the grooves 23g in the respective retainer members 23d and the corresponding hooks 22d of the holder base 22. Then, the rear part of the pen holder 23 is lifted up. As a result, the pen holder 23 is pivoted about the pin 23c to take such an inclined posture as shown in FIG. 9, so that the hooks 22d and the corresponding grooves 23f engage with each other to maintain this posture of the pen holder 23. With the pen holder 23 kept in this posture, the four pens Pa to Pd are loaded thereonto.

It is to be noted that the above-mentioned operation is carried out in both unloading and replacing the pens.

When the pens are unloaded or replaced, the pen holder 23 is pivoted about the pin 23c located above the axes of the pens Pa to Pd. Therefore, as shown in FIG. 10, when the pen holder 23 is pivoted the pen points rotate in the direction for coming away from the platen 4. Accordingly, unlike the case where the pivot of the pen holder 23 is disposed at a position O in FIG. 10 (a position below the axes of the pens), there are no possibilities that the pen points may come close to the platen 4. Therefore, there are also no possibilities that the pen points may stain the recording sheet S disposed on the front surface of the platen 4.

(Operation of Pen Changeover Mechanism)

The operation of the pen changeover mechanism is shown in FIGS. 4 to 7 together with FIGS. 2 and 3.

In an ordinary state, the actuator of the bilateral stable type self-maintaining solenoid SLa provided outside the left side plate 1 is urged in one direction to rotate the pen changeover shaft 12 counterclockwise, as viewed in FIG. 2, (in the direction of the arrow (c)). Together with the pen changeover shaft 12, the urging lever 30 is rotated in the direction of the arrow (c) and stabilized in the rotated position. Accordingly, the lock lever 27 on the hammer base 21 is resiliently pressed in the direction of the arrow (a) by the force of the spring 29 to bring the rear part of the lock lever 27 in contact with the pressing portion 30b of the urging lever 30. When the lock lever 27 is pivoted in the direction of the arrow (a), the lock member 27b at the front end of the lock lever 27 upwardly projects from the square bore 21e in the hammer base 21 to enter the inside of one of the four square bores 22g formed in the bottom part of the holder base 22. By the lock member 27b, the hammer base 21 and the holder base 22 are locked into each other so as to be one unit. Therefore, in a recording operation, when the motor My (see FIG. 1) rotates to apply a driving force to the holder base 22 in the Ya-Yb directions through the wire 14, the holder base 22 and the hammer base 21 move as one unit in the Ya-Yb directions along both the guide shaft 11 and the pen changeover shaft 12.

Figure 4:
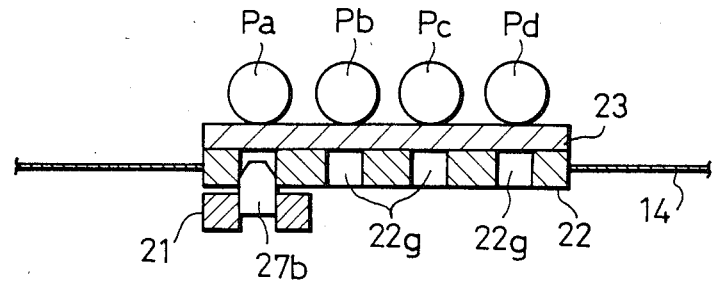
FIG. 4 is a sectional view showing the operation of a lock mechanism of the pen recorder shown in FIG. 1 in the pen changeover operation.
Figure 5:
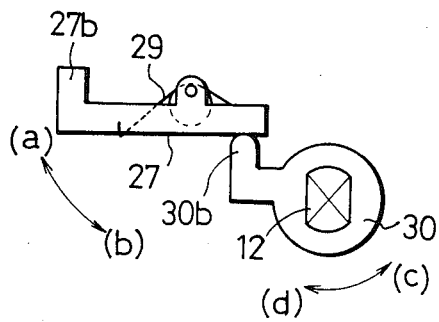
FIGS. 5 and 6 are side elevational views showing the operation of the lock mechanism shown in FIG. 4.
Figure 7:
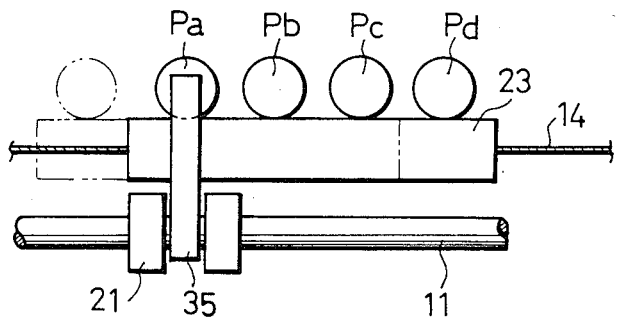
FIG. 7 is a rear view showing the positional relationship between a hammer mechanism and pens employed in the pen recorder shown in FIG. 1 when the pens are changed over.

In the state where the hammer base 21 and the holder base 22 are in one unit as mentioned above, when the lock member 27b is in engagement with one of the four square bores 22g in the holder base 22 which is directly below the leftmost pen Pa, for example, as shown in FIG. 4, the hammer 35 provided in the rear part of the hammer base 21 faces the rear end of the leftmost pen Pa (see FIG. 7). Accordingly, when the hammer 35 is driven by the operation of the hammer driving mechanism, described later, the leftmost pen Pa is pushed out toward the platen 4. More specifically, in the state shown in FIGS. 4 and 7, the leftmost pen Pa is selected to effect a writing operation.

Figure 6:
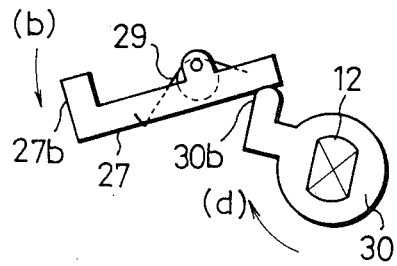

When the pens are to be changed over, the solenoid SLa is energized to rotate both the pen changeover shaft 12 and the urging lever 30 in the direction of the arrow (d). As a result, as shown in FIG. 6, the pressing portion 30b of the urging lever 30 upwardly presses the rear part of the lock lever 27 to pivot the same in the direction of the arrow (b). Consequently, the lock member 27b comes off from the square bore 22g in the holder base 22, so that the hammer lever 21 and the holder base 22 are once separated to be free from each other. Under this state, the motor My is started to rotate the driving bobbin 17 to move the holder base 22 in the Ya direction (or the Yb direction) through the wire 14. The movement of the holder base 22 is set so as to correspond to the pen to be changed over. To select the pen Pb, for example, the holder base 22 is moved to the position where both the lock lever 27 and the hammer 35 face the pen Pb. Thereafter, the solenoid SLa is energized again to rotate both the pen changeover shaft 12 and the urging lever 30 in the direction of the arrow (c). Then, the lock member 27b of the lock lever 27 is fitted into the square bores 22g directly below the pen to be selected (e.g., Pb). As a result, the hammer lever 21 and the holder base 22 are united again, and the hammer 35 faces the rear end portion of the pen selected.

In the above pen changeover operation, when the holder base 22 is moved in the Ya-Yb directions on the hammer base 21, as shown in FIG. 6, the lock lever 27 is pressed by means of the urging lever 30. At this time, according to the rotation angle of the lock lever 27, the resilient force of the spring 29 is applied to the urging lever 30 from the pressing portion 30b to press the urging lever 30 in the direction of the arrow (c). This pressing force produces a frictional force in the contact area between the urging lever 30 and the pen changeover shaft 12. Accordingly, when the holder base 22 is moved in the Ya-Yb directions through the wire 14 in order to select one of the pens, the frictional force prevents the hammer lever 21 from moving on the pen changeover shaft 12. As a result, the position of the hammer 35 is accurately maintained during the movement of the holder base 22.

(Operation of Hammer Mechanism)

When the pen recorder is not in a recording operation, the bilateral stable type self-maintaining solenoid SLb provided outside the right side plate 2 is energized to rotate the hammer driving shaft 13 in the direction of the arrow (h) and keep the same in this rotated state (see FIG. 2). As a result, the pressure plate 13a attached to the central part of the hammer driving shaft 13 as one unit presses the roller 38 provided in the lower part of the hammer 35 to pivot the hammer 35 in the direction of the arrow (f), so that the pressing portion 35c at the upper end of the hammer 35 separates from the rear end portion of the pen. Consequently, the pen is pushed in the Zb direction on the pen holder 23 by the pressing force of the corresponding leaf spring 24, causing the pen point to separate from the recording sheet S.

On the other hand, during a recording operation, the solenoid SLb is energized to rotate both the hammer driving shaft 13 and the pressure plate 13a in the direction of the arrow (g) and keep them in this rotated state. In consequence, the hammer 35 is pivoted in the direction of the arrow (e) by the resilient force of the spring 37, so that the pressing portion 35c at the upper end of the hammer 35 presses the rear end portion of the pen. As a result, the pen is pushed in the Za direction, and the pen point abuts against the recording sheet S.

Moreover, when the carriage 20 is pulled in the Ya-Yb directions through the wire 14, the roller 38 in the lower part of the hammer 35 rolls along the front surface of the pressure plate 13a. Accordingly, the carriage 20 smoothly moves.

(Method of Setting Initial Position of Pens)

Figure 11:
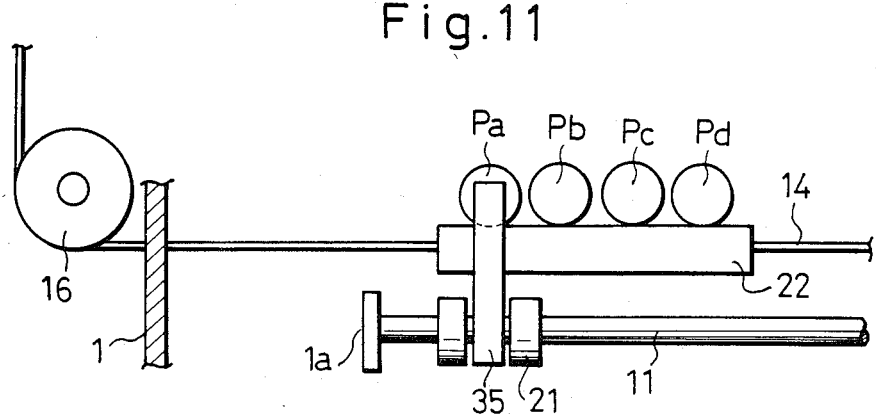
FIGS. 11, 12 and 13 are rear views in combination showing the operation for setting the initial position of the pens.

When the pen recorder is started, it is necessary to effect an initial setting of the position of the hammer base 21 and the position of the holder base 22 on the hammer base 21 in order to establish a reference for the operation for selecting the pens Pa to Pd. An initial position setting method therefor will be described hereinunder with reference to FIGS. 11 to 13.

Figure 12:
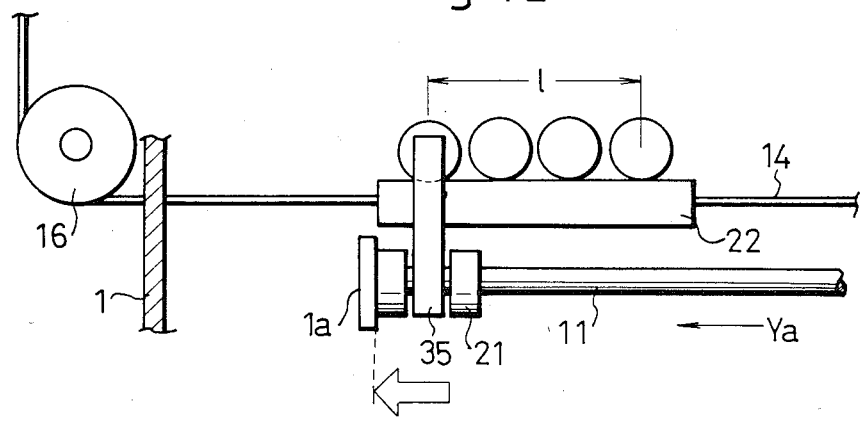

At the point of time when the power source for the pen recorder is turned ON, the position of the hammer base 21 is unknown. Therefore, the initial position of the hammer base 21 is previously set. First of all, the pulse motor My is started immediately after the power source is turned ON, to pull the holder base 22 in the Ya direction through the wire 14. In this case, the hammer base 21 and the holder base 22 are connected as one unit through the lock lever 27. Accordingly, the hammer base 21, together with the holder base 22, is also moved in the Ya direction. The moving distance of the hammer base 21 is set to be a length obtained by adding a predetermined margin to its maximum movable distance on the assumption that the hammer base 21 is located at the rightmost position (the end portion in the Yb direction) on the guide shaft 11. More specifically, the pulse motor My is driven by driving pulses in number corresponding to the maximum movable distance plus the margin. Thus, as shown in FIG. 12, the hammer base 21 invariably moves on the guide shaft 11 to the position where the hammer base 21 abuts against the leftmost support member 1a. If the hammer base 21 is at an intermediate position on the guide shaft 11 before the power source is turned ON, the hammer base 21 cannot further move after abutting against the support member 1a. Since the number of driving pulses is set on the assumption of the maximum movable distance, however, after the hammer base 21 abuts against the support member 1a, the rotor of the pulse motor My suspends, and the driving pulses are oscillated in vain (i.e., the pulse motor My is made to step out).

After the hammer base 21 is abutted against the support member 1a, the position of the holder base 22 on the hammer base 21 is initially set.

Figure 13:
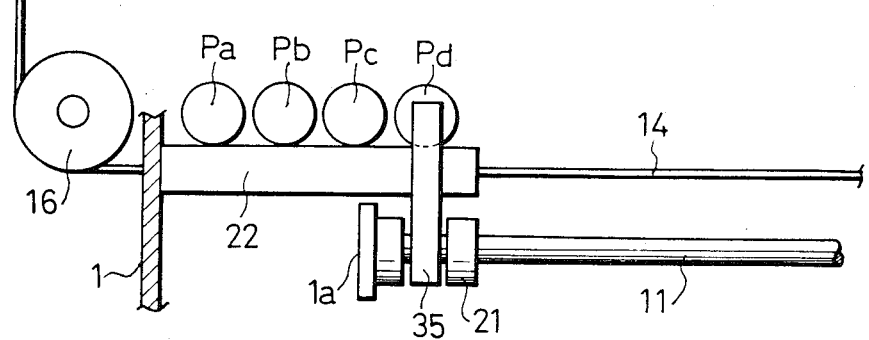

In the above setting operation, after the initial position of the hammer base 21 is set, first, the lock lever 27 is operated by the solenoid SLa to separate the hammer base 21 and the holder base 22 from each other. Then, the pulse motor My is operated again to move the holder base 22 in the Ya direction again until the holder base 22 abuts against the inner surface of the left side plate 1 as shown in FIG. 13. In this case, the moving distance of the holder base 22 driven by the pulse motor My is set to be the maximum movable distance of the holder base 22. More specifically, the moving distance is set on the assumption that the leftmost pen Pa has been selected before the hammer base 21 and the holder base 22 separate from each other (the state shown in FIGS. 11 and 12). Accordingly, the drive by the pulse motor My effected after the hammer base 21 and the holder base 22 separate from each other is performed by the driving pulses in number corresponding to the value obtained by adding a predetermined margin to the maximum movable distance l of the holder base 22. Therefore, if the hammer base 21 has selected a pen rightward of the pen Pb before the hammer base 21 and the holder base 22 separate from each other, the holder base 22 abuts against the left side plate 1 with a moving distance shorter than l after the hammer base 21 and the holder base 22 separate from each other. Also in this case, since the number of the driving pulses is constant, the pulse motor My is made to step out after the hammer base 22 abuts against the left side plate 1. Thus, the holder base 22 invariably abuts against the left side plate 1.

By the step-out operation of the pulse motor My in the above two stages, the initial setting of the hammer base 21 and the holder base 22 is completed. When the pen recorder operates thereafter, the position of the hammer base 21 and that of the holder base 22 are controlled on the basis of the above initial positions.

(Recording Operation by Pens)

As shown in FIG. 2, the recording sheet S is placed on the front surface of the platen 4 and clamped by the platen 4 and the pinch roller 8. When the pulse motor Mx is started, the platen 4 is rotated to move the recording sheet S in the Xa-Xb directions.

When the pulse motor My is started, on the other hand, the carriage 20 equipped with the pens Pa to Pd is moved while reciprocating in the Ya-Yb directions. During this movement, the solenoid SLb is actuated to cause the hammer 35 to press the pen in the Za direction in order to make the pen point abut against the recording sheet S. Thus, a character, symbol or the like according to the movements in the X and Y directions is drawn on the recording sheet S.

Moreover, when a color is changed in a recording operation, the pen changeover mechanism is operated to select one of the pens Pa to Pd which is for a desired color.

(Modification of the Invention)

It is to be noted that although in the illustrated embodiment the holder base 22 is pulled through the wire 14, the hammer base 21 disposed on the lower side of the holder base 22 may be pulled through the wire 14, and the lock lever 27 may be mounted on the holder base 22.

(Advantages of the Invention)

As has been described, the invention offers the following advantages:

(1) Since a plurality of pens are provided in parallel on the holder base, the pen holding portion can be made thinner, so that it is possible to reduce the pen recorder in size.

(2) Since the pens are provided in parallel to each other, it is easy to replace the pens, one by one, and there is no need for such troublesome operations that the whole pens are loaded/unloaded when only one pen is replaced and that the pen holder is rotated to the position where the pens can be loaded and unloaded, which are required in the conventional rotary pen holder.

(3) The pens are changed over by moving the holder base and the hammer base relatively to each other. Therefore, the pen changeover operation can be effected speedily, and such a time for selecting a desired pen through the rotation of the pen holder as in the conventional rotary pen holder is not required. Accordingly, the recording time can be shortened.

(4) As the mechanism for changing over the pens by moving the relative positions of the holder base and the hammer base, it is only necessary to have a drive source for the printing operation of the pens, such as a pulse motor, and one solenoid. Therefore, it is possible to reduce the number of parts required for constituting the operating mechanisms, and the electrical control is facilitated.

Although the invention has been described through specific terms, it is to be noted here that the described embodiment is not exclusive and various modifications and changes may be imparted thereto without departing from the scope of the invention which is limited solely by the appended claims.

What is claimed is:

1. A pen recorder comprising:
   two bases adapted to be movable together in longitudinal directions parallel to a platen, one of said bases being driven by a driving means in said movement along said platen;
   a plurality of pens mounted in parallel on one of said bases;
   a hammer mounted on the other of said bases for pressing a selected pen toward said platen in a recording operation, said hammer mounting base being selectively movable linearly relative to the pen mounting base so as to locate the hammer in a position corresponding to the selected pen;
   pen changeover means including a lock mechanism interposed between said bases for locking said bases together when the hammer is located at the position corresponding to the selected pen for the recording operation; and
   changeover driving means mounted to a frame of the pen recorder at a position remote from said bases, said locking mechanism being actuated by a driving cam slidably mounted on a driving shaft extending parallel to said platen and connected to said remote changeover driving means.

2. The pen recorder of claim 1, wherein said two bases are an upper base mounting said plurality of pens in a row parallel to the platen and a lower base mounting the hammer and said pen changeover means, said locking mechanism being a pivotable lever having one end adapted to be inserted through and removed from a notch in the lower base and a selected notch in the upper base corresponding to the position of the selected pen, and the other end of said lever being actuated by said driving cam operated by a changeover driving means.

3. The pen recorder of claim 1, wherein said changeover driving means is an electromagnetically operated device.

4. The pen recorder of claim 1, wherein the hammer is actuated by a hammer driving cam slidably mounted on a driving shaft extending parallel to said platen and connected to a hammer driving means mounted to a frame of the pen recorder at a position remote from said bases.

5. A pen recorder according to claim 1, wherein said pens are slidably retained by support pieces provided on said one base.

6. A pen recorder according to claim 1, wherein said lock mechanism is constituted by a plurality of engaging portions formed on said one base and a lock lever provided on said the other base, said lock lever being engageable with said engaging portions, thereby to connect said bases while changing over the relative position therebetween in a plurality of stages.

7. A pen recorder according to claim 1, wherein said support pieces are arranged zigzag in pairs.

8. A pen recorder according to claim 1, wherein said lock lever has a lock member with tapered side surfaces.

9. A pen recorder according to claim 1, wherein said lock member is urged toward said engaging portions.

10. A pen recorder according to claim 1, wherein said one base is driven by a driving means such as a wire.

11. A pen recorder according to claim 1, wherein said the other base is driven by a driving means such as a wire.

* * * * *